United States Patent [19]

Seibold

[11] 4,037,323
[45] July 26, 1977

[54] GRASS TRIMMING DEVICE

[76] Inventor: Paul F. Seibold, 26665 York Road, Huntington Woods, Mich. 48070

[21] Appl. No.: 682,516

[22] Filed: May 3, 1976

Related U.S. Application Data

[63] Continuation of Ser. No. 331,491, Feb. 12, 1973, abandoned.

[51] Int. Cl.² .............................................. B26B 19/14
[52] U.S. Cl. ........................................ 30/206; 30/207
[58] Field of Search ................... 30/26, 205, 207, 240, 30/276

[56] References Cited

U.S. PATENT DOCUMENTS

| | | | |
|---|---|---|---|
| 1,766,270 | 6/1930 | Thrower | 30/205 |
| 2,556,790 | 6/1951 | Berdan | 30/276 X |
| 2,645,010 | 7/1953 | Holmes | 30/206 X |
| 2,699,605 | 1/1955 | Setter | 30/206 |
| 2,832,184 | 4/1958 | Beuerle | 30/276 X |
| 2,883,746 | 4/1959 | Gilsi | 30/205 |
| 3,050,854 | 8/1962 | Becker | 30/264 X |

*Primary Examiner*—Al Lawrence Smith
*Assistant Examiner*—J. C. Peters
*Attorney, Agent, or Firm*—Harness, Dickey & Pierce

[57] ABSTRACT

The trimming device has a blade driven by a shaft to have each end pass over cutting teeth at the forward edge of a circular cutting plate. The drive mechanism may be a belt or a gear train driven by a motor which is mounted on a frame to which a top and bottom plate is secured. A housing encloses the drive mechanism having a handle containing a switch and a receptacle for the prongs on a plug-in cord.

3 Claims, 3 Drawing Figures

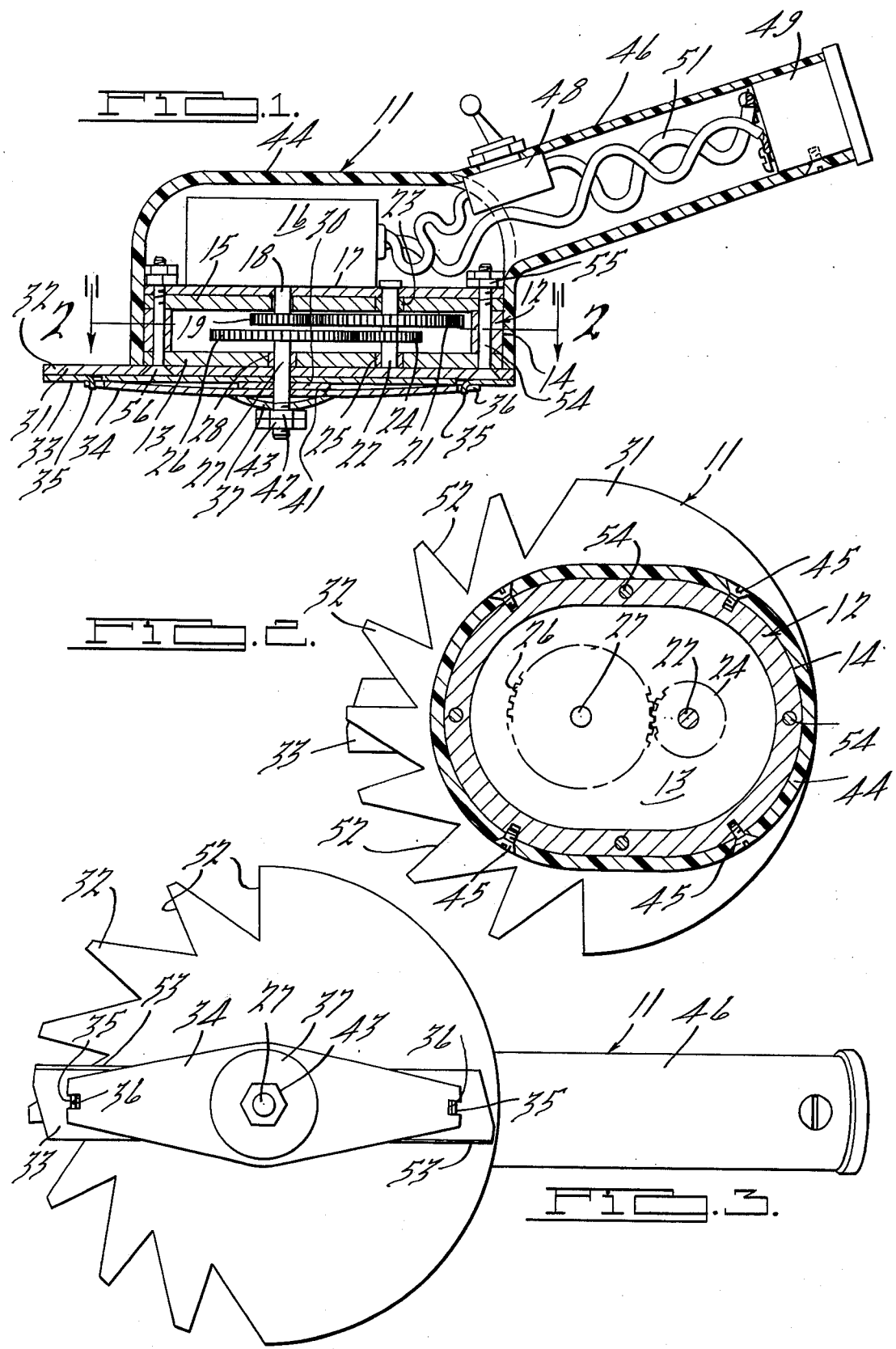

GRASS TRIMMING DEVICE

This is a continuation of application Ser. No. 331,491, filed Feb. 12, 1973 now abandoned.

BACKGROUND OF THE INVENTION

Grass trimming shears have been provided for many years which are hand or motor operated and more recently a scissors type of trimming device has been developed employing an oscillating movement for cutting the grass. A motor driven cutting bar supported on a long handle was employed as a trimmer. The shears type of trimmer, whether manually or electrically operated, has questionable cutting ability and the cutting bar supported by the motor was objectionable because of the high speed of operation.

SUMMARY OF THE INVENTION

The invention pertains to a trimmer for grass and like material which has a disk shaped cutter plate containing teeth at the forward edge. A cutting bar is held against the bottom of the plate and rotated to have the ends pass across the teeth to produce the cutting action. An oval frame supports a train of gears and also a motor for driving the train for driving the shaft which supports the cutting bar. A plastic housing extends downwardly over the frame and is secured thereto by radially disposed screws. The top of the housing has a handle containing a switch at the front end and a receptacle for a pronged plug at the rear end connected by conductors to the motor. The cutting bar and an arched pressure bar are interconnected and freely swingable on the driven shaft. The pressure bar extends outwardly adjacent the ends of the cutting bar and are interlocked therewith by interengaging fingers and apertures. A dished disk is fixed to the driving shaft in engagement with the arched pressure bar to provide a friction drive therebetween. Nuts provided on the end of the driven shaft are adjustable to regulate the amount of friction in the drive and also to lock the dished disk in fixed relation to the the shaft.

BRIEF DESCRIPTION OF THE DRAWING

FIG. 1 is a sectional view of a trimming device embodying features of the present invention;

FIG. 2 is a sectional view of the structure illustrated in FIG. 1, taken on the line 2—2 thereof, and FIG. 3 is a bottom view of the structure illustrated in FIG. 1.

DESCRIPTION OF THE PREFERRED EMBODIMENT

The trimming device 11 comprises a frame 12 of oval form having a bottom plate 13 and an oval outer wall 14. An oval plate 15 encloses the top of the frame 12. A motor 16 is supported on a plate 17, the drive shaft 18 of which extends through apertures through the plates 17 and 15 for supporting a gear 19 therebelow. The gear 19 drives a gear 21 fixed to a shaft 22 which is mounted in a sleeve bearing 23 in the plate 15 for rotating a gear 24 fixed to the shaft 22 which is also journaled in a sleeve bearing 25 in the bottom plate 13. The gear 24 drives a gear 26 on a driven shaft 27 which is mounted in a sleeve bearing 28 in the bottom plate 13. The shaft 27 extends through an aperture in the cutter plate 31 wich has a plurality of cutting teeth 32 on the forward edge. A cutting bar 33 is freely rotatable on the shaft 27 along with a backup bar 34 which is maintained in aligned relation therewith by struck-out fingers 35 from the cutter bar 33 which extends into an aperture 36 in the ends of the backup bar. A washer 30 on the shaft 27 is disposed between the cutting bar 33 and the backup bar 34. A dished washer 37 is fixed to the end of the shaft 27 its edge 41 exerting a predetermined pressure against the backup bar 34 to provide a friction drive for the cutter bar 33 therewith. The applied friction is regulated by a nut 42 which is locked in adjusted position by a second nut 43.

A housing 44, which is preferably made of plastic material, slides over the oval wall 14 of the frame 12 to which it is secured by a plurality of screws 45, as illustrated in FIG. 2. The housing covers the frame 12 and motor 16 and is provided with a handle 46 which supports a switch 48 adjacent to the housing and a receptacle 49 for a pronged plug at the remote end. A pair of conductors 51 are disposed within the handle 46 to interconnect the receptacle 49 with the switch 48 and also with the motor 16. The teeth have the cutting edges 52 so disposed relative to the center of the shaft 27 as to be passed over by the cutting edges 53 of the cutting bar 33 in X-relation such as occurs with a scissors. By employing a thin spring steel cutting bar 33 backed up by a backup bar 34 the cutting edge 53 will always pass along the cutting edges 52 from the inner to the outer ends thereof and will thereby assure a perfect cutting relation for severing the grass which projects into the slots between the teeth. Should a stick or other obstacle enter a slot between the teeth, the cutter bar will be stopped in its rotation until the slot is cleared without doing any damage to the operating parts of the device.

The gears 19 and 21 for a like pair of small diameter while the gears 24 and 26 form a like pair of a larger diameter. The diameter of the pairs was chosen to reduce the speed of the driven shaft 27 to approximately 100 R.P.M. although a greater or lesser speed could be employed. After the shafts 18, 22 and 27 have been assembled on the plates 13, 15 and 17, the plates are secured to the frame 12 along with the cutter plate 31 by a plurality of bolts 54. The bolts extend through aligned apertures in the plates and frame and are secured by a pair of nuts 55 which lock the plates and frame together and prevent the bolt heads 56 from dropping down and be engaged by the cutting bar 33. It is to be understood that chargeable batteries could be mounted within the housing to operate a low voltage motor following the common practice in the art. The frame 12 and plate 13 could be a unit casting and the shafts 22 and 27 could be made of brass to eliminate the sleeve bearings. The gears and shafts are eliminated when built into the motor.

I claim:

1. In a hand trimmer for grass, a motor having a shaft, means driving said shaft by speed reducing means located directly adjacent to said motor, a thin, flat circular plate having an aperture through the center through which said driven shaft extends, teeth on the forward half edge portion of said plate, the rear half-edge portion of the plate having a free unbroken edge, a blade secured at its center to said driven shaft and having a length substantially equal to the diameter of said plate, notches cut in the forward half edge portion of the plate forming said teeth, one side edge of the notches being radially disposed to form cutting edges, the other side of the notches being tangent to a circle approximately half the radius of the plate for trapping the grass when the trimmer is advanced thereinto, said blade having its centerline aligned with the center of the driven shaft with the cutting edges disposed parallel to but offset in opposite directions therefrom each side of the driven shaft so as to produce a scissor-like cut with the radially disposed cutting edges, the single blade is driven by the motor at reduced speed so as to permit the grass to be moved into the notches between the passage of each half of the blade thereover, whereby each half of the blade cuts the grass as they advance seriatim over the notches so that only a single cut occurs to the grass within a notch at any one time thereby limiting the power requirement for the cutting operation to a minimum.

2. In a trimming device, a unit motor having a reduction drive means, a pot-like cover and handle, a shaft driven by said drive means at reduced speed relative to the motor speed, a thin, flat circular plate supported on the bottom of said unit having an aperture through which the driven shaft extends, teeth on the forward one-half edge portion of said plate, the one-half edge portion rearwardly thereof being continuous and providing a free edge, a cutting bar supported by said shaft across said plate with one half having a cutting edge along one side for passing over said teeth and cutting the material projecting therebetween so that only one cut occurs at a time, the other half of the bar having a cutting edge along the opposite side passing across the continuous portion and free edge of the plate during each revolution of the cutting bar, said motor being enclosed by said pot-like cover with the cover and handle offset rearwardly from the aperture in the plate.

3. In a trimming device as recited in claim 2, wherein a bowed spring strip is mounted on said shaft having its ends secured to said bar at points substantially midway between the length of said teeth.

* * * * *